July 12, 1932.    L. DURNER    1,867,308
HYDRAULIC SPEED TRANSMISSION
Filed April 4, 1931    2 Sheets-Sheet 1
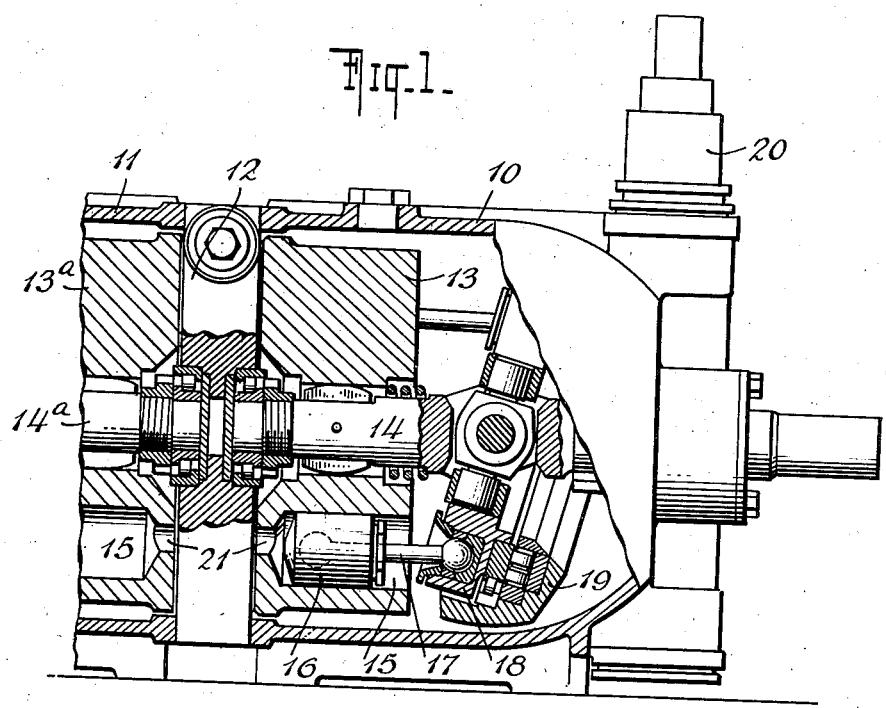
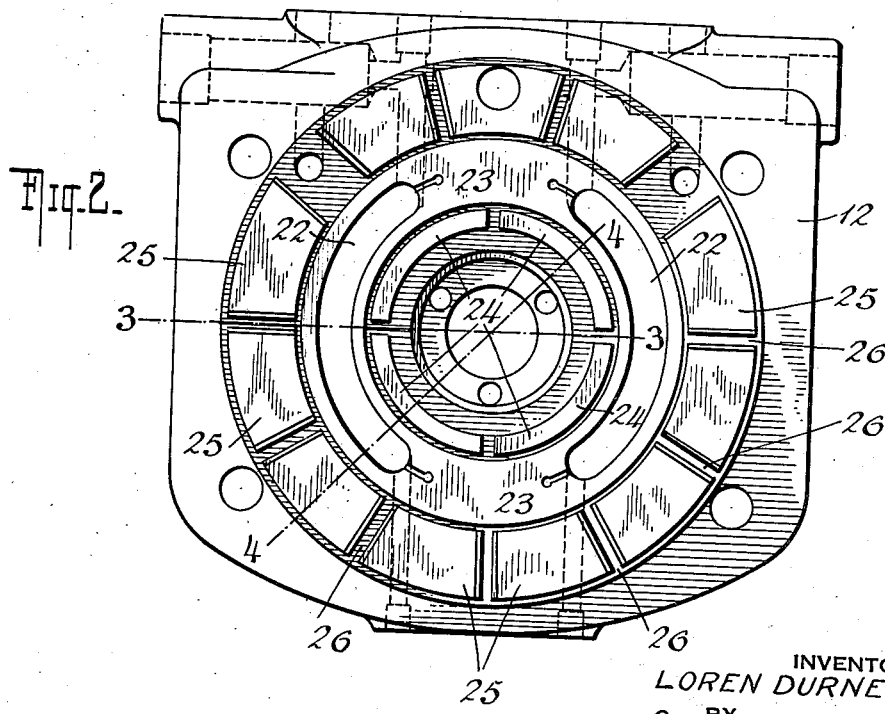
INVENTOR
LOREN DURNER
BY
ATTORNEYS July 12, 1932.  L. DURNER  1,867,308
HYDRAULIC SPEED TRANSMISSION
Filed April 4, 1931  2 Sheets-Sheet 2
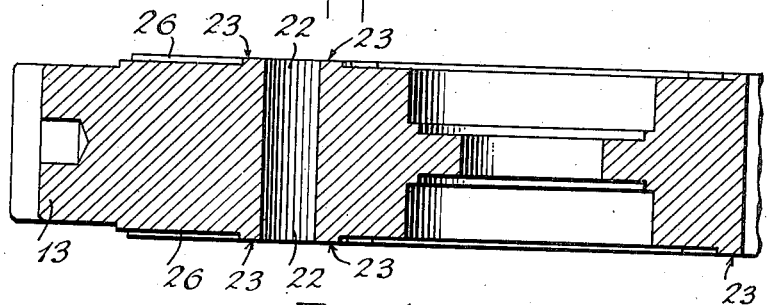
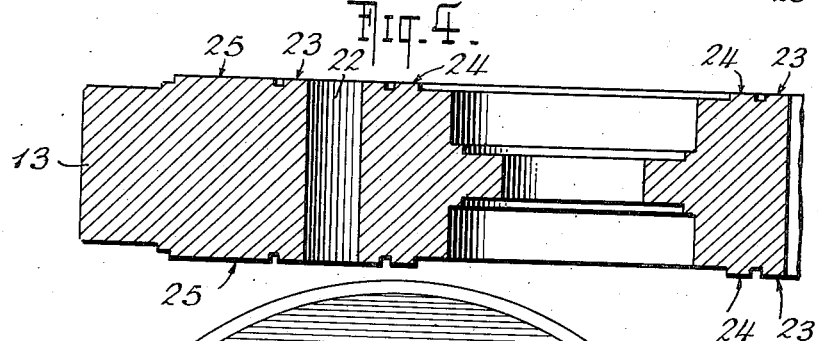
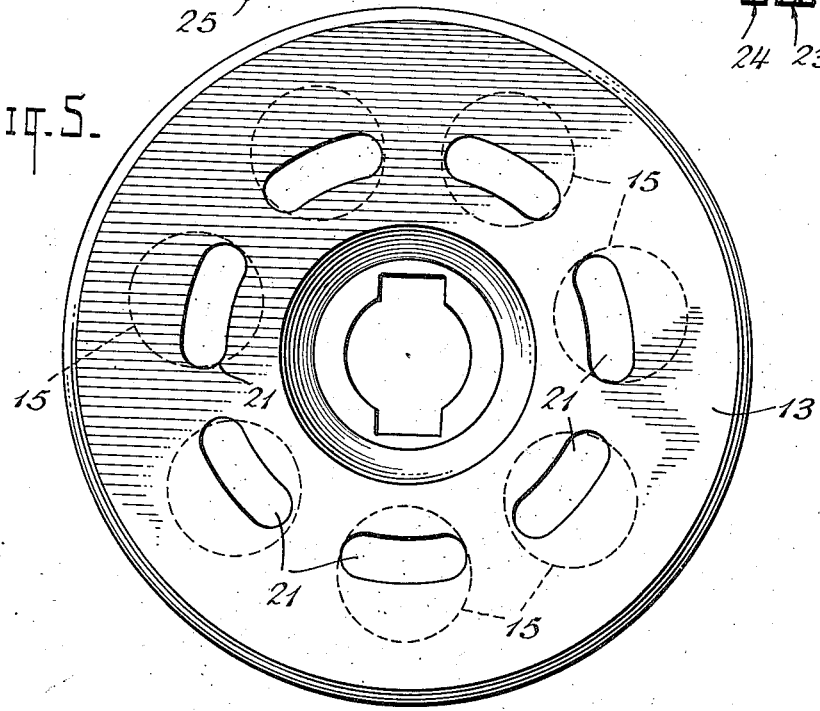
INVENTOR
LOREN DURNER
BY
ATTORNEYS Patented July 12, 1932

1,867,308

UNITED STATES PATENT OFFICE

LOREN DURNER, OF WATERBURY, CONNECTICUT, ASSIGNOR TO THE WATERBURY TOOL COMPANY, OF WATERBURY, CONNECTICUT, A CORPORATION OF CONNECTICUT

HYDRAULIC SPEED TRANSMISSION

Application filed April 4, 1931. Serial No. 527,684.

The invention relates to hydraulic variable speed transmissions of the well known type which comprise hydraulic pumps and hydraulic motors constructed either as individual units connected by suitable tubing, or as parts of a combined pump and motor unit. Such transmissions customarily include rotating cylinder barrels provided with a plurality of cylinders and pistons reciprocable therein, and valve plates co-operating with the cylinders of said barrels to properly control and direct the flow of the operating fluid, such as oil under pressure. It is characteristic of this class of transmissions that the cylinder barrels must be maintained against the valve plates to secure operative efficiency.

The invention contemplates the provision of a novel bearing surface between the cylinder barrel and the valve plate whereby the operative efficiency of the transmission is brought to and maintained at maximum efficiency by the prevention of undue leakage of operating fluid, and by avoiding the danger that conditions will be developed which will cause the materials to seize and abrade. Other more specific objects will appear from the description hereinafter, and the features of novelty will be pointed out in the claims.

In the accompanying drawings, which illustrate an example of the invention without defining its limits, Fig. 1 is a fragmentary sectional elevation of a hydraulic speed transmission embodying the novel features; Fig. 2 is a face view of the novel valve plate; Figs. 3 and 4 are fragmentary sectional views, on an enlarged scale, of the valve plates, taken respectively on the lines 3—3 and 4—4 of Fig. 2, and Fig. 5 is a face view of one end of a characteristic cylinder barrel.

As shown in Fig. 1 the transmission comprises a unit consisting of a hydraulic pump 10 commonly referred to as an A—end, and a co-operating hydraulic motor 11 commonly termed a B—end, in combination with a valve plate 12 which in the illustrated example is common to both the pump 10 and motor 11 and serves to direct and control the flow of the operating fluid from the pump or A—end 10 to the motor or B—end 11 in the customary manner, as will appear more fully hereinafter. It will be understood that the illustrated example is not to be construed as defining the limits of the invention, and that the pump 10 and motor 11 may be constructed as individual units connected by suitable tubing in the well known way, in which case the pump 10 and motor 11 will each include an independent valve plate 12. It will further be obvious that the novel features may be efficiently embodied in hydraulic speed transmission in which the details of construction are different from that of the illustrated example, but which operate in accordance with the same general principle.

As shown in Fig. 1 the pump 10 and motor 11 each consist of a suitable casing in which rotatable cylinder barrels 13 and 13a respectively are mounted, the barrel 13 being fixed upon the driving shaft 14 of the pump 10, which shaft is suitably connected in any well known way with a source of power such as a conventional electric motor, while the barrel 13a is correspondingly secured upon the driven shaft 14a of the motor 11. The cylinder barrels 13 and 13a are provided with a plurality of cylinders 15 in which pistons 16 are mounted for reciprocation in the usual manner, said pistons 16 being connected by means of piston rods 17 with swash plates 18. The latter are rotatably mounted in boxes 19, the box of the pump 10 being generally referred to as a tilting box and being capable of adjustment to different angular positions to vary the speed and direction of operation of the transmission, while the box 19 of the motor 11 generally occupies a fixed inclined position therein, although this is not an arbitrary arrangement. In order to adjust the tilting box 19 of the pump to different positions, any suitable type of conventional adjusting means 20 may be provided; as this adjusting means form no part of the instant invention it has not been deemed necessary to illustrate the same in detail. Each cylinder 15 is provided at its inner end with a port 21 adapted to be brought into registry, in operative sequence, with a pair of arcuate ports 22 provided in the valve plate 12, as shown in Fig. 2.

In practice, as the pump 10 is operated the pistons 16 thereof will be reciprocated in the cylinders 15 and accordingly will circulate the operating fluid through the ports 21 of the pump cylinders, the arcuate ports 22 of the valve plate 12 and the ports of the motor cylinders 15; in this way the pistons 17 of the motor 11 will be reciprocated to operate the swash plate 18 thereof whereby the driven shaft 14a will be actuated in the well known way. During given operative periods, there will accordingly be pressure in one or the other or both of the arcuate ports 22, according to the setting of the transmission and the operation being performed thereby. The speed and direction of operation of said shaft 14a will be dependent upon the degree and direction of inclination of the tilting box 19 of the motor 10; if said tilting box 19 occupies a position at right angles to the shaft 14, which is termed the neutral position, no operating fluid will be pumped and the motor or B—end 11 will remain stationary even though the pump or A—end 10 is operating. This is in accordance with the usual practice in transmissions of the indicated type.

As shown in Figs. 1 and 5, the ports 21 are off-set relatively to the axes of the cylinders 15 and are smaller in dimensions than the latter, the end face of the barrel 13 in which said ports 21 are located being perfectly flat in the example shown in Figs. 1 and 5; the cylinders 15 thus each include end faces in which the ports 21 are located. With this arrangement, when the transmission is in operation, a pressure will be developed by the operating fluid against said inner end surfaces of the cylinders as said fluid is forced therefrom through the relatively smaller ports 21 by the action of the pistons 16; this pressure tends to hold the cylinder barrels 13 and 13a against the valve plate 12. In installations which include individual A—ends and B—ends, each provided with its own valve plate 12, the same pressure will be developed in the cylinders thereof, and in the same way acts to maintain the cylinder barrels against the independent valve plates in a corresponding manner. In existing construction this developed pressure ofttimes tends to force the cylinder barrels away from the valve plates at comparatively low pressures, while in other instances, the aforesaid pressure conditions will cause the materials of the cylinder barrels and valve plates to seize and abrade. It is essential in the type of transmission under discussion that the cylinder barrel be held against the valve plate in such a manner that only a slight film of oil is located therebetween; if too much space exists between the cylinder barrel and the valve plate excessive leakage of oil will occur, while if the surface engagement between the cylinder barrel and valve plate is too severe, the materials, as stated above, will seize and abrade.

In order to provide a construction in which all of the operative requirements are met with maximum efficiency and the objectionable features are obviated, the valve plate 12 is provided with a novel arrangement of bearing surfaces co-operating with the end face of a cylinder barrel to produce the desired results. In the illustrated example the valve plate 12 accordingly includes a relatively narrow annular bearing surface 23 in which the arcuate ports 22 are located as shown in Fig. 2. In addition, the valve plate 12 may include bearing surfaces 24 in the form of segments and located within the annular bearing surface 23 with their opposed ends spaced apart; these segmental bearing surfaces are relatively less in radial width than the surface 23 as clearly illustrated in Fig. 2. In some cases these surfaces 24 may be omitted. During the operative periods of the transmission there is, as before stated, pressure in one or the other or both of the ports 22 and oil tends to leak slowly across the bearing surface 23 and to develop a force tending to separate the cylinder barrel and the valve plate. If the bearing surface 23 is of large surface dimensions, this pressure tending to push the cylinder barrel away from the valve plate will be of large extent and the cylinder barrel accordingly will move away from the valve plate at comparatively low operative pressures and result in excessive leakage of operating oil or other fluid. If on the other hand the bearing surface 23 is made smaller in surface dimensions then the pressure tending to separate the cylinder barrel and valve plate will be of small extent; under such conditions the cylinder barrel 13 will be forced into engagement with the valve plate 12 by the pressure existing in the cylinders 15 against the inner ends thereof, with the result that the cylinder barrel 13 is held against the valve plate 13 at high pressures. If the latter become too great the materials will seize and abrade To overcome these objections and to provide an arrangement of maximum efficiency under all developed conditions auxiliary bearing surfaces 25 are provided on the valve plate 12. These auxiliary surfaces 25 comprise segmental pads arranged in the form of an annulus about the bearing surface 23 in outer radial relation thereto and having their opposed ends spaced apart to form radial oil channels 26 as shown in Fig. 2; these pads 25, in the preferred arrangement, constitute integral parts of the valve plate 12, as illustrated in Figs. 3 and 4, this being true also of the bearing surface 23 and the surfaces 24, if the latter are included in the construction. The dimensions of the bearing pads 25 should preferably be such that the length of the pads in circumferential directions is approximately one and one half times the radial width thereof and should not be much greater, although the dimensions in some cases may be less without materially affecting the functioning efficiency of the auxiliary bearing surfaces or pads 25.

With the novel arrangement the auxiliary bearing surfaces or pads 25 are engaged by the end face of the cylinder barrel 13, to form therewith an efficient bearing means over which said end face travels in the rotation of said cylinder barrel 13 when the transmission is in operation; in addition the end face of said barrel 13 also contacts with the bearing surface 23, and the segmental surfaces 24, if the latter are present. The oil channels 26 induce the oil across the pads 25 in the direction of their width and preferably are slightly bevelled along their opposite edges in order to force the oil in at these points. The oil film which is required between the cylinder barrel and the valve plate is thereby created and maintained at maximum efficiency at all times. The novel valve plate construction makes it possible to carry very much higher oil pressures in the transmission than is at present possible, without causing any breaking down of the surfaces of either the valve plate or the cylinder barrel. Maximum operative efficiency is thereby provided with ideal conditions regarding leakage of oil and the development of pressure tending to force the cylinder barrel away from the valve plate. In other words, the cylinder barrel is held firmly against the valve plate with just a slight film of oil between it and said valve plate and thus provides the feature which, as before stated, is quite essential in the type of transmission for which the improvements are designed. Under such conditions the rotation of the cylinder barrel proceeds with a minimum of frictional and other resistance and in a position of maximum efficiency with respect to the valve plate.

It will be understood that in transmission units of the form illustrated, in which a single valve plate is common to the hydraulic pump and hydraulic motor of the unit, said valve plate will have the bearing surfaces 25, as well as the surfaces 23 and 24 formed upon both of its surfaces, as shown in Figs. 3 and 4, it being understood, as previously mentioned, that the surfaces 24 may in some cases be omitted. On the other hand, if the pump and motor constitute individual units of the transmission each having its own valve plate, then said bearing surfaces will be located upon only one surface of each valve plate.

The novel features are inherently simple in construction and do not materially add to the cost of production, and at the same time increase the efficiency of the transmissions in which they are embodied to a maximum extent.

Various changes in the specific forms shown and described may be made within the scope of the claims without departing from the spirit of the invention.

I claim:—

1. In a hydraulic speed transmission including a rotating cylinder barrel having a rigid flat end face and provided with cylinders having reduced ports in said flat end face of the barrel, a valve plate provided with arcuate ports co-operating with the ports of said cylinders to control the flow of the operating pressure fluid, an annular bearing surface on said valve plate arranged to be engaged by said flat end face of said cylinder barrel, said arcuate ports being located in said bearing surface, and a plurality of rigid segmental auxiliary bearing surfaces on said valve plate in surface engagement with the flat end face of said barrel and located annularly about said annular bearing surface in radially spaced outward relation thereto, and having their opposed ends spaced apart to form radial channels covered by said flat end face whereby pressure fluid leakage is induced across said auxiliary bearing surfaces to form a film between said cylinder barrel and valve plate, said oil channels being bevelled along their opposite sides to force the pressure fluid inwardly at these points.

2. In a hydraulic speed transmission including a rotating cylinder barrel having a rigid flat end face and provided with cylinders having reduced ports in said flat end face of the barrel, a valve plate provided with arcuate ports co-operating with the ports of said cylinders to control the flow of the operating pressure fluid, an annular bearing surface on said valve plate arranged to be engaged by said flat end face of said cylinder barrel, said arcuate ports being located in said bearing surface, and a plurality of rigid segmental auxiliary bearing surfaces on said valve plate in surface engagement with the flat end face of said barrel and located annularly about said annular bearing surface in radially spaced outward relation thereto, and having their opposed ends spaced apart to form radial channels covered by said flat end face whereby pressure fluid leakage is induced across said auxiliary bearing surfaces to form a film between said cylinder barrel and valve plate.

3. In a hydraulic speed transmission including a rotating cylinder barrel having a rigid flat end face provided with cylinders having ports in said flat end face of the barrel, a valve plate provided with arcuate ports co-operating with the ports of said cylinders to control the flow of the operating pressure fluid, a plurality of rigid segmental bearing pads in surface engagement with said flat end face of said barrel and arranged annularly about said arcuate ports on said valve plate in radially outward relation thereto, and having their opposed ends spaced apart to form radial oil channels covered by said flat end face whereby pressure fluid leakage is induced across said bearing pads to form a fluid film between said cylinder barrel and valve plate.

4. In a hydraulic speed transmission including a rotating cylinder barrel and a valve plate, one of said elements being provided with a plain rigid bearing surface, and a plurality of rigid segmental bearing pads on the other element in surface engagement with said plain bearing surface and having their opposed ends spaced apart to form radial oil channels in the plane of said bearing pads covered by said plane bearing surface whereby pressure fluid leakage is induced across said bearing pads to form a fluid film between said cylinder barrel and valve plate, the latter and said barrel having ports cooperating to control the flow of the operating pressure fluid.

In testimony whereof I have hereunto set my hand.

LOREN DURNER.